Sept. 26, 1939.  S. C. LYONS  2,173,975
METHOD OF AND APPARATUS FOR BLUNGING CLAY
Filed Feb. 14, 1936
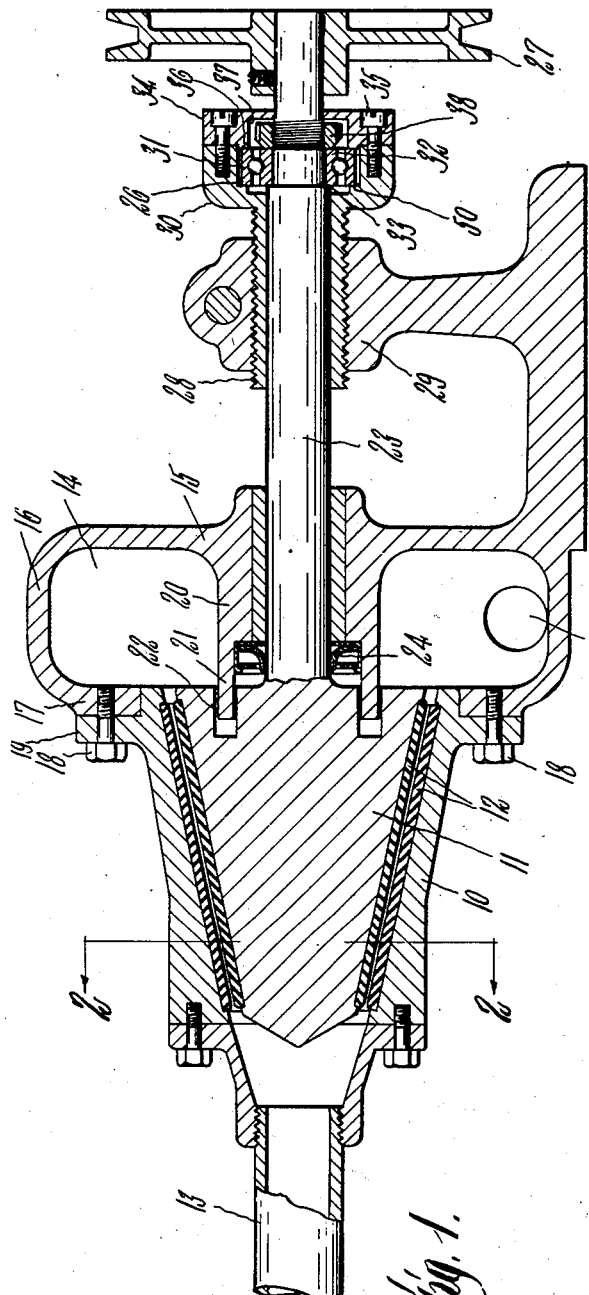
Inventor
Sanford C. Lyons
by Wright, Brown, Quinby & May
Attys.

Patented Sept. 26, 1939

2,173,975

UNITED STATES PATENT OFFICE 2,173,975

METHOD OF AND APPARATUS FOR BLUNGING CLAY

Sanford C. Lyons, Bennington, Vt., assignor to Bird Machine Co., Walpole, Mass., a corporation of Massachusetts Application February 14, 1936, Serial No. 63,878

10 Claims. (Cl. 83—94)

This invention relates to the blunging of clay and deals with a method of and apparatus for preparing aqueous clay suspensions of fine particle size. While not limited thereto, the present invention may be applied to especial advantage in the preparation of suspensions of crude or freshly quarried clay whose coarse impurities are to be removed therefrom and which may undergo other purifying or refining treatments preparatory to the recovery therefrom of their valuable clay content.

Before entering into a discussion of the present invention and the results secured thereby, it is well to consider somewhat the nature of clay and some of the factors affecting the preparation of aqueous clay suspensions. It is well known that clay as quarried in various localities must be purified before it is suitable for pigmenting, filling, and other purposes. Thus, the clay employed as a body-filler or coating in paper must be rid of such oversized quartz, mica, and other particles as may be associated with the crude clay. Such clays as are quarried in various parts of the United States, for instance, South Carolina, Georgia, and other southern States, are typical of those containing oversized or coarse impurities and hence requiring treatment designed to eliminate these impurities.

The most effective methods used for eliminating oversized impurities from clay involve putting the clay into aqueous suspension and removing the oversized impurities from suspension by settling them or otherwise taking advantage of their greater tendency toward subsidence than the much finer kaolin particles. The act of putting the clay into aqueous suspension is generally known as blunging.

Crude clays may be classified broadly according to their responsiveness to blunging action, that is, in terms of the ease with which they may be disintegrated and put into aqueous suspension. Those clays which may be readily disintegrated and suspended in water are known as soft kaolins; those that are resistant to blunging action are characterized as semi-hard clays; and those that are highly resistant to blunging action and disintegrate only to a very limited extent when subjected to known commercial blunging methods are termed hard kaolins. It so happens that despite the refractory nature of the hard kaolins, they constitute a most important potential source of raw material for the preparation of refined clay such as is desired for pigmenting, filling, and other purposes, since they are of intrinsically finer average particle size than the soft or semi-hard clays. However, the intrinsically fine clay particles in hard clays are compacted and coalesced into such refractory aggregates that known commercial blunging methods yield suspensions whose clay solids are largely in the form of so-called pinheads or aggregates easily visible to the naked eye and from which only a small useable or fine particle size fraction can be recovered. It is for this reason that at the present time only the soft clay deposits and some of the semi-hard clay deposits are being commercially exploited for the preparation of refined, fine particle size clay.

I have found that crude clays of all sorts, including even the hard or refractory clays, may be readily and substantially completely disintegrated to the desired fine particle size in the presence of water by the rubbing and shearing action thereupon of relatively moving surfaces between which the clay is delivered, provided that such surfaces present high frictional resistance to the clay, such as is presented more particularly by rubber or equivalent resilient material whose coefficient of friction toward clay is notably high, for instance, is much higher than that of steel and other metals. The method of the present invention utilizes this principle in that it involves streaming the kaolin in the form of an aqueous suspension in between and out of the sphere of action of relatively moving surfaces having the appropriate resiliency or coefficient of friction toward clay and clearing each other in their relative movement only by such small distance as is attended by a rubbing and shearing action on the clay aggregates present in the suspension and a consequent liberation in the aqueous suspending medium of the ultimate or intrinsically fine particles of which the aggregates are composed. It is thus seen that it is possible by the practice of the present invention initially to effect a rough or coarse suspension of the clay in water and then to subject the coarse clay particles or palpable aggregates as suspended in water to rubbing and shearing action effective in reducing the aggregates to the desired fine particle size so that only a small fraction of the clay is lost along with the coarse impurities removed by settling or otherwise from the resulting suspension.

The present invention may be practiced to advantage in apparatus enabling a continuous treatment of the initially prepared coarse suspension, for instance, in apparatus comprising confronting surfaces of the appropriate characteristics only slightly clearing each other so as to define a clearance space through which the suspension is caused to stream continuously as the surfaces are made to move continuously relative to each other and in so doing to effect the desired reduction of the coarse clay particles. Thus, the apparatus may include a conically shaped stationary shell within which is arranged a conically shaped rotary plug whose peripheral surface clears the internal wall of the shell only slightly, the peripheral surface of the plug and the internal wall of the shell being of such resilient or frictional quality that as coarse clay suspension is passed through the clearance space between the plug and the shell wall it undergoes the mechanical treatment resulting in the desired break-up of the clay aggregates into ultimate clay particles.

With the foregoing and other features and objects in view, the present invention will now be described in further detail with particular reference to the accompanying drawing wherein—

Figure 1 represents a longitudinal vertical section through apparatus embodying the present invention.

Figure 2 is a transverse vertical section through the apparatus on the line 2—2 of Figure 1.

Before being subjected to the action of the apparatus herein, crude clay may be admixed with water and put through a disintegrator such as is generally used in the industry. Such a disintegrator may consist generally of an elongated shell within which are arranged a pair of coacting spiked rotary shafts, the spikes of one shaft entering into the spaces between the spikes of the other and, as the shafts are rotated and the clay-water mixture is being fed through the shell, acting to reduce the chunks of crude clay sufficiently to form a coarse suspension. Assuming that the clay is hard or semi-hard, the resulting suspension will contain the clay mostly in the form of aggregates or so-called pinheads; and it is in connection with such coarse suspension that the apparatus herein has its greatest utility.

The apparatus shown in Figure 1 comprises a stationary shell 10 whose internal wall defines a frusto-conical chamber. Arranged within the chamber is a frusto-conical plug or rotor 11 whose peripheral surface is substantially complemental to and only slightly clears the internal wall of the shell. Both the internal wall of the shell and the peripheral surface of the plug may be covered by a layer of rubber 12 or other material having the desired resiliency or coefficient of friction, which may be vulcanized or otherwise suitably secured to the body structures of the shell and plug; and, as shown, the confronting rubber surfaces of the shell and plug are substantially smooth and coextensive so that the clay aggregates or coarse clay particles in aqueous suspension pass through an elongated, substantially uniform, annular gap or clearance defined between the surfaces from one end of the shell to its other end.

The coarse clay suspension may be fed continuously from a suitable source of supply (not shown) through a pipe 13 leading into the small diameter end of the chamber and pass through the small gap or narrow clearance space between the shell and plug into a compartment 14 arranged to receive the suspension emerging from the clearance space at the large diameter end of the chamber. The compartment 14 may be defined by a closure 15 located next to the large diameter end of the plug-chamber and affording a bearing or support for the shaft by which the plug is rotated. The closure shown includes a cylindrical peripheral portion 16 flanged inwardly as at 17 and secured thereat, as by bolts 18, to an annular flange 19 projecting outwardly from the shell 10. It includes also an inwardly projecting hub 20 whose inner end portion 21 fits loosely into an annular recess 22 formed in the large diameter end portion of the plug. The hub thus serves to confine the suspension in the annular compartment 14 defined thereby and by the peripheral closure portion 16. A plug shaft 23 journaled for rotation in the hub passes out beyond the hub to suitable bearing and driving elements presently to be described. Such suspension as leaks past the inner end portion 21 of the hub is kept from leaking out of the hub by a suitable packing gland or box 24 encompassing the shaft 23 and fixed in a countersunk portion of the hub adjacent to the large diameter end of the plug. The suspension is delivered from the chamber 14 through an outlet opening 25 to settling tanks or other apparatus in which the suspension is to be further treated.

The shaft 23 is shown as passing from the hub 20 through and beyond an end-thrust ball bearing 26 and carrying affixed thereto at its end portion a pulley 27 which may be driven from an electric motor or other suitable means (not shown). The housing for the bearing 26 is preferably of a construction permitting longitudinal movement of the shaft and, accordingly, adjustment or variation of the clearance space or gap between the plug 11 and the shell 10, when this may be desired. As shown, the housing may include a tubular member 28 through which the shaft 23 passes and which is threaded into a bracket 29 and thus fixed against movement. The outer end portion 30 of the tubular member 28 may be of enlarged cup shape and its internal wall may be recessed and have fitted therein the outer ball-bearing race 31 with the inner end of the latter held against an annular shoulder 50 therein. The inner ball-bearing race 32 may be suitably fixed to the shaft and its inner end abut against an annular shoulder 33 in the shaft. The cup-shaped portion 30 may be closed off by a plate 34 removably secured thereto, as by screws 35. The plate has a central opening through which the shaft 23 passes and an annular lug 36 clamping the outer race 31 to the shoulder 50 and thus fixing it against longitudinal or rotary movement. It is also recessed or hollowed immediately inwardly of the lug 36 to provide space 37 for a stop or thrust-piece, here shown in the form of a nut 38 threaded on to the shaft and engaged by the outer end of the inner race 32. When it is desired to adjust the clearance between the plug 11 and the shell 10, the tubular member 28 is turned in the bracket 29 to effect a longitudinal movement of the shaft and of the ball bearing 26, thrust-piece 38, and pulley 27 affixed thereto.

As coarse clay suspension is passed through the annulus or clearance space between the rotating plug and the stationary shell, it is exposed to the relatively moving rubber surfaces, in consequence of which the clay aggregates present therein undergo drastic hydraulic shearing and rubbing or smearing action such as is most effective in liberating the ultimate clay particles thereof in the aqueous medium. The aggregates are evidently rubbed intensively against one another as well as against the rubber surfaces; and, by virtue of the fact that the large diameter end of the plug or rotor has a peripheral speed greater than the small diameter end, the shearing and rubbing forces and the attendant particle-liberating effect increases as the suspension proceeds from the intake toward the exit end of the clearance space. By providing a gap or clearance of the appropriate size between the plug and the shell, by operating the rotor at the appropriate peripheral speed, and by feeding clay suspension at the appropriate rate through the gap, it is possible to ensure the emergence from the gap of a clay suspension containing substantially all the clay in its ultimately fine or colloidal condition. The particular conditions under which the apparatus is operated will, of course, depend upon the character and coarseness of the clay suspension delivered thereto.

While not limited thereto, I might indicate generally the sort of clay suspensions or slips that may be treated hereby, the conditions under which they may be treated hereby, and the results realized from such treatment. The content of aggregates or pinheads in a clay suspension subjected to the treatment hereof may vary widely, depending upon the nature of the raw crude clay and the effectiveness of the primary blunger in suspending the ultimate clay particles. Thus, a hard clay may, after the primary blunging, contain as high as 70% pinheads, a substantial fraction of which are of a size in the order of magnitude of about 10 mesh; whereas, at the other extreme, a soft clay may emerge from the primary blunger with as little as 6% unblunged pinheads of a size coarser than 200 mesh. In passing through the apparatus hereof, the clay suspension may be acted upon by relatively moving surfaces, e. g., the rotating plug and stationary shell hereof, whose relative velocities are in the order of magnitude of 1000 to 5000 feet per minute. It will, of course, be appreciated that in the case of the rotating plug herein described, the peripheral speed of the plug, upon which the degree of blunging or ultimate particle suspension depends in considerable measure, is determined not only by its angular velocity but also by its diameter. The clearance between the plug and the stationary shell necessary for realizing the desired blunging action varies not only with the particular clay being treated but also with the rate of feed of clay suspension through the clearance and the relative velocity of the clearing or acting surfaces. I have established that clearances of about 0.015 to 0.030" are satisfactory for very hard clays and that soft clays are readily blunged with larger clearances, say, about 0.030 to 0.100". After passing through the apparatus hereof, in all instances, that is, using various kinds of clay, the emergent suspension contains only a very small percentage of pinheads or unblunged clay; and, in the case of a soft clay, such percentage may be extremely low, for instance, even less than 1% of clay particles coarser than 200 mesh.

Because there is no actual contact between the relatively moving rubber surfaces and because they are of a resilient or yielding nature, not only is the apparatus of the present invention economical with respect to power consumption, but oversized particles such as quartz, mica, sand, etc., emerge from between such surfaces in substantially unreduced particle size so as to lend themselves to ready removal, as by settling, from the much finer or colloidal clay particles in suspension. It is thus seen that, whereas, on the one hand, the clay aggregates are broken up to the desired degree by the intensive shearing and frictional gripping or smearing action effected thereupon by the relatively moving rubber surfaces, on the other hand, the quartz, mica, sand, and other coarse, hard, and inherently unitary particles are not reduced significantly in particle size but are evidently caused merely to roll and rebound between the relatively moving resilient surfaces until they emerge therefrom.

While it is possible to liberate the inherently fine or colloidal particle content of hard clays by passing them through colloid mills, hammer-mills, or similar conventional machines, nevertheless, such machines are unsatisfactory in certain vital respects. One trouble with such machines is that all clays, especially the desirable ones of colloidal variety, contain a substantial fraction of comparatively coarse, hard, jagged impurities, such as quartz, mica, and sand, which tend to erode and wear out steel and other metallic parts very rapidly. Another trouble is that metallic parts cause the subdivision or reduction of the coarse impurities to such fine particle size that their subsequent removal from the fine or colloidal clay particles in suspension is rendered more difficult, insomuch that an unduly large residue of such impurities is apt to remain in the recovered or refined clay.

It is to be understood that the method and apparatus of the present invention may be applied in the treatment of other than crude or freshly quarried clay suspensions. Thus, the principles of the present invention may be extended to the treatment of clay suspensions prepared from previously purified or refined clays, for instance, from dried purified clays to be resuspended in their ultimate or colloidal particle size in water preparatory to their use as pigment or filler in papers, ceramics, or other products. While I have indicated that rubber is suitable as the material of construction for the relatively moving surfaces between which coarse clay suspensions is treated in accordance with the present invention, it is to be understood that various rubber substitutes and other materials of construction might be used to provide surfaces of the requisite characteristics. For instance, artificial resins of the nature of "Bakelite" and "Vinylite" might be employed for such purpose in lieu of rubber; and such resins may be used either alone or combined with woven fabric or other fibrous material as surfacing layers or sheets whose resiliency or coefficient friction toward clay is in the same order of magnitude as that of rubber or rubber compounds.

I claim:

1. A method of blunging crude kaolin of intrinsically fine particle size and containing oversized impurities of the nature of sand and mica, which comprises streaming such kaolin in the form of an aqueous suspension containing a substantial fraction of palpable aggregates of the ultimate kaolin particles in between and out of the sphere of action of relatively moving resilient surfaces clearing each other by such small definite gap and at such high relative speed as is attended by shearing and rubbing action on said aggregates and liberation in the aqueous suspending medium of the ultimate intrinsically fine particles while said oversized impurities are preserved in essentially unreduced size.

2. A method of preparing clay of fine particle size from crude kaolin of intrinsically fine particle size and containing oversized impurities of the nature of sand and mica, which comprises streaming such kaolin in the form of an aqueous suspension containing a substantial fraction of palpable aggregates of the ultimate kaolin particles in between and out of the sphere of action of relatively moving resilient surfaces clearing each other by such small definite gap and at such high relative speed as is attended by shearing and rubbing action on said aggregates and liberation in the aqueous suspending medium of the ultimate intrinsically fine particles while said oversized impurities are preserved in essentially unreduced size; and removing the oversized impurities from the suspension emerging from between such surfaces.

3. A method of blunging crude kaolin of intrinsically fine particle size and containing oversized impurities of the nature of sand and mica, which comprises streaming such kaolin in the form of an aqueous suspension containing a substantial fraction of palpable aggregates of the ultimate kaolin particles in between and out of the sphere of action of relatively moving rubber surfaces clearing each other by a gap of about 0.015 to 0.100" and at a relative speed in the order of magnitude of 1000 to 5000 feet per minute, thereby effecting shearing and rubbing action on said aggregates and liberation in the aqueous suspending medium of the ultimate intrinsically fine particles while preserving said oversized impurities in essentially unreduced size.

4. A method of preparing clay of fine particle size from crude kaolin of intrinsically fine particle size and containing oversized impurities of the nature of sand and mica, which comprises streaming such kaolin in the form of an aqueous suspension containing a substantial fraction of palpable aggregates of the ultimate kaolin particles in between and out of the sphere of action of relatively moving rubber surfaces clearing each other by a gap of about 0.015 to 0.100" and at a relative speed in the order of magnitude of 1000 to 5000 feet per minute, thereby effecting shearing and rubbing action on said aggregates and liberation in the aqueous suspending medium of the ultimate intrinsically fine particles while preserving said oversized impurities in essentially unreduced size; and removing the oversized impurities from the suspension emerging from between such surfaces.

5. A method of preparing clay of fine particle size from crude kaolin of intrinsically fine particle size and containing oversized impurities of the nature of sand and mica, which comprises streaming such kaolin in the form of an aqueous suspension containing a substantial fraction of palpable aggregates of the ultimate kaolin particles in between and out of the sphere of action of relatively moving surfaces having a resilient or yielding action on said aggregates and oversized impurities but clearing each other by such small definite gap and at such high relative speed as is attended by selective shearing action on said aggregates and liberation in the aqueous suspending medium of the ultimate intrinsically fine particles while said oversized impurities are preserved in essentially unreduced size; and removing the oversized impurities from the suspension emerging from between such surfaces.

6. A method of blunging clay of intrinsically fine particle size and containing intrinsically oversized impurities that do not tend to disintegrate under hydraulic shearing force, which comprises streaming such clay in the form of an aqueous suspension in between and out of the sphere of action of relatively moving resilient surfaces clearing each other by such small gap and at such high relative speed as is attended by the liberation in the aqueous suspending medium of the intrinsically fine clay particles while said oversized impurities are preserved in essentially unreduced size.

7. A method of preparing a clay product of fine particle size from clay of intrinsically fine particle size and containing intrinsically oversized impurities that do not tend to disintegrate under hydraulic shearing force, which comprises streaming the clay in the form of an aqueous suspension in between and out of the sphere of action of relatively moving resilient surfaces clearing each other by such small gap and at such high relative speed as is attended by the liberation in the aqueous suspending medium of the intrinsically fine clay particles while said oversized impurities are preserved in essentially unreduced size; and removing the oversized impurities from the suspension emerging from between such surfaces and thereby producing a suspension of said clay product.

8. A clay-blunging apparatus for treating aqueous clay suspension associated with intrinsically coarse impurities and selectively reducing clay aggregates in said suspension to the intrinsically fine particles of which they are composed while said impurities are essentially preserved in their intrinsically coarse condition, which comprises confronting, smooth, rubber-like surfaces only slightly but definitely clearing each other and defining an annular clearance space, means for continuously streaming said clay suspension into the clearance space between such surfaces and out of such space, means for causing continuous relative movement of at least about one thousand feet per minute between such surfaces, one of said surfaces being fixed relative to the other, and means for receiving the suspension emerging from said clearance space, said clay aggregates being reduced to the intrinsically fine particles of which they are composed but said intrinsically coarse impurities essentially remaining in their intrinsically coarse condition as said suspension streams through said clearance space and is subjected to the hydraulic shearing forces developed by said relatively moving surfaces.

9. A clay-blunging apparatus for treating aqueous clay suspension associated with intrinsically coarse impurities and selectively reducing clay aggregates in said suspension to the intrinsically fine particles of which they are composed while said impurities are essentially preserved in their intrinsically coarse condition, which comprises confronting, substantially coextensive, smooth rubber-like surfaces clearing each other and defining an annular clearance space of about 0.015 to 0.100", means for continuously streaming said clay suspension into the clearance space between such surfaces and out of such space, means for causing continuous relative movement of at least about one thousand feet per minute between such surfaces, one of said surfaces being fixed relative to the other, and means for receiving the suspension emerging from said clearance space, said clay aggregates being reduced to the intrinsically fine particles of which they are composed but said intrinsically coarse impurities essentially remaining in their intrinsically coarse condition as said suspension streams through said clearance space and is subjected to the hydraulic shearing forces developed by said relatively moving surfaces.

10. A clay-blunging apparatus for treating aqueous clay suspension associated with intrinsically coarse impurities and selectively reducing clay aggregates in said suspension to the intrinsically fine particles of which they are composed while said impurities are essentially preserved in their intrinsically coarse condition, which comprises a conically-shaped shell, a conically-shaped plug arranged within said shell and having a peripheral surface substantially complemental to the internal wall of said shell and clearing said wall by a clearance space of 0.015 to 0.100", both the peripheral surface of said plug and said internal wall being substantially smooth and being composed of rubber-like material, means for rotating said plug at a peripheral speed of at least about one thousand feet per minute, and means for continuously streaming said clay suspension into one end of the clearance space between said plug and shell and for receiving the suspension emerging from the other end of said clearance space, said clay aggregates being reduced to the intrinsically fine particles of which they are composed but said intrinsically coarse impurities essentially remaining in their intrinsically coarse condition as said suspension streams through said space and is subjected to the hydraulic shearing forces developed between said rotating plug and said shell.

SANFORD C. LYONS.